United States Patent
Bajraktari et al.

(10) Patent No.: US 10,812,557 B2
(45) Date of Patent: *Oct. 20, 2020

(54) PLAYBACK OF AN UNENCRYPTED PORTION OF AN AUDIO STREAM

(71) Applicant: SPOTIFY AB, Stockholm (SE)

(72) Inventors: Ardit Bajraktari, New York, NY (US); Luc Succes, New York, NY (US); Tristan Jehan, New York, NY (US); Bror Simon Hofverberg, Partille (SE); Niklas Martin Gustavsson, Gothenburg (SE); Pär Mikael Bohrarper, Gothenburg (SE); Babar Zafar, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,467

(22) Filed: Mar. 15, 2019

(65) Prior Publication Data

US 2019/0215355 A1 Jul. 11, 2019

Related U.S. Application Data

(63) Continuation of application No. 14/714,138, filed on May 15, 2015, now Pat. No. 10,237,320.

(51) Int. Cl.
*H04L 29/06* (2006.01)
*H04L 12/58* (2006.01)
(Continued)

(52) U.S. Cl.
CPC ............ *H04L 65/604* (2013.01); *G06F 16/60* (2019.01); *G06F 16/683* (2019.01);
(Continued)

(58) Field of Classification Search
CPC .......... G06F 17/3074; G06F 17/30743; G06F 17/30746; G06F 16/68; G06F 16/685; H04L 65/604
See application file for complete search history.

(56) References Cited

U.S. PATENT DOCUMENTS 6,385,596 B1  5/2002 Wiser et al.
8,631,089 B1 * 1/2014 Pereira ................... G06F 3/165
                                                  705/14.37

(Continued)

FOREIGN PATENT DOCUMENTS

DE  102005033211  1/2007
WO  2014001913    1/2014

OTHER PUBLICATIONS

International Search Report of the International Searching Authority dated Jan. 13, 2014 for PCT Application No. PCT/IB2013/001938, 5 pages.

(Continued)

*Primary Examiner* — Jeong S Park
(74) *Attorney, Agent, or Firm* — Tucker Ellis LLP

(57) ABSTRACT

This disclosure concerns the providing of media, and more particularly to the streaming of media. In one example embodiment of a method for streaming an audio content item to an electronic device, the method comprises: receiving a first data message comprising instructions from an electronic device to return a preview segment associated with a selected audio content item, the preview segment being a portion of the selected audio content item; retrieving said selected audio content item from a first storage; analyzing audio content of the retrieved audio content item to locate a portion of the selected audio content item to be used as the preview segment; extracting the located portion of the selected audio content item from the retrieved audio content (Continued)

item; and transmitting the extracted portion of the selected audio content item unencrypted to the electronic device.

20 Claims, 12 Drawing Sheets

(51) Int. Cl.
*G06F 16/60* (2019.01)
*G06F 16/683* (2019.01)
(52) U.S. Cl.
CPC ............ *G06F 16/685* (2019.01); *H04L 51/10* (2013.01); *H04L 51/18* (2013.01)

(56) References Cited

U.S. PATENT DOCUMENTS

| | | | |
|---|---|---|---|
| 9,195,383 B2 | 11/2015 | Garmark et al. | |
| 9,635,068 B2 | 4/2017 | Garmark et al. | |
| 9,942,283 B2 | 4/2018 | Garmark et al. | |
| 10,237,320 B2* | 3/2019 | Bajraktari | G06F 16/60 |
| 2002/0156691 A1* | 10/2002 | Hughes | H04L 69/329 |
| | | | 705/51 |
| 2004/0064209 A1* | 4/2004 | Zhang | G11B 27/036 |
| | | | 700/94 |
| 2005/0147256 A1* | 7/2005 | Peters | G06F 16/634 |
| | | | 381/56 |
| 2010/0037274 A1 | 2/2010 | Meuninck et al. | |
| 2011/0196973 A1 | 8/2011 | Shaheen et al. | |
| 2014/0006483 A1 | 1/2014 | Garmark et al. | |
| 2014/0280181 A1 | 9/2014 | Rodger et al. | |
| 2014/0338515 A1* | 11/2014 | Sheffer | G10H 1/0025 |
| | | | 84/609 |
| 2016/0247328 A1* | 8/2016 | Han | H04N 21/4394 |

OTHER PUBLICATIONS

Written Opinion of the International Searching Authority dated Dec. 29, 2014 for PCT Application No. PCT/IB2013/001938, 18 pages.

\* cited by examiner

PLAYBACK OF AN UNENCRYPTED PORTION OF AN AUDIO STREAM

CLAIM OF PRIORITY

This application is a continuation of, and claims the benefit of priority to, U.S. patent application Ser. No. 14/714,138, titled "PLAYBACK OF AN UNENCRYPTED PORTION OF AN AUDIO STREAM", filed May 15, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure generally relates to the providing of media, and more particularly to the streaming of media. In particular, the embodiments described herein relate to methods and computer server systems for streaming an audio content item to an electronic device, whereby a portion, or part, of a selected audio content item can be transmitted unencrypted to the electronic device. The embodiments described herein also relate to corresponding methods and electronic devices for playback of an audio content item.

BACKGROUND

This section is intended to provide a background to the technology described in this disclosure. This background may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

As computer technology has improved, the digital media industry has evolved greatly in recent years. Users are able to use electronic devices such as mobile communication devices (e.g., cellular telephones, smart phones, tablet computers, etc.) to consume music, video and other forms of media content. For instance, users can listen to audio content (e.g., music) and/or watch video content (e.g., movies, television (TV) broadcasts, etc.) on a variety of electronic devices.

At the same time, advances in network technology have increased the speed and reliability with which information can be transmitted over computer networks. It is therefore possible for users to stream media content over computer networks as needed, or on demand, rather than transmitting a complete file in physical media (such as CD or DVD, or downloading the entire file) before consuming the media content.

Some music streaming services allow users to browse a catalog, or collection, of songs and to select song(s) from the catalog. When using the music streaming service, the user can thus browse a multitude of songs, or albums of songs, and listen to short preview segments of these songs. At the same time, content owners typically desire its content to be protected from unauthorized copying, or theft. Therefore, in order to protect the content it is common that content owners require encryption of the content, and/or related technical measures. Decryption of encrypted content commonly involves exchange of cryptographic keys and additional communications between the computer server system that provides the music streaming service and the electronic device that playbacks the music. When browsing a multitude of encrypted shorter preview segments of the songs, the additional time associated with the exchange of cryptographic keys and/or the additional communications between the computer server and the electronic device may result in a delay of the playback of the preview segments of the songs. The browsing of music may therefore be perceived as unnecessarily time consuming and, hence, cumbersome to some users. Also, despite the advances in computer network speed and reliability, some existing solutions for streaming music may involve relatively long loading times of the encrypted preview segments of these songs. This may e.g. be particularly true when transitioning, or switching, between various encrypted preview segments when utilizing a wireless network with limited bandwidth. Thus, if a user attempts to scan, or browse, through several selectable songs of a collection of songs over such network, the user may sometimes experience breaks when loading the encrypted shorter preview segments of the songs. This may be perceived as frustrating or annoying to some users, particularly at times when the user cannot devote all of his/her attention to making the selection or at times when he/she wants or needs to locate a particular song quickly.

SUMMARY

It is in view of the above considerations and others that the various embodiments disclosed herein have been made.

It is a general object of the embodiments described herein to allow for an improved way of browsing audio content items such as songs, which, at the same time, allows for sufficient protection against unauthorized use of the streamed audio content items.

This general object has been addressed by the appended independent claims. Advantageous embodiments are defined in the appended dependent claims.

According to a first aspect, a method for streaming an audio content item to an electronic device is provided. The method is performed by, or otherwise executed in, a computer server system. Typically, the computer server system comprises a single computer server, or alternatively, a plurality of computer servers. The method comprises: receiving a first data message comprising instructions from an electronic device to return a preview segment associated with a selected audio content item, the preview segment being a portion of the selected audio content item; retrieving said selected audio content item from a first storage; analyzing audio content of the retrieved audio content item to locate a portion of the selected audio content item to be used as the preview segment; extracting the located portion of the selected audio content item from the retrieved audio content item; and transmitting the extracted portion of the selected audio content item unencrypted to the electronic device.

In some embodiments, retrieving said selected audio content item from the first storage comprises retrieving the entire selected audio content item from the first storage.

In some embodiments, the method comprises partially encrypting the selected audio content item by encrypting an unextracted portion of the audio content item and leaving the extracted portion of the selected audio content item unencrypted. In one embodiment, the method also comprises transmitting the partially encrypted audio content item to the electronic device.

In some embodiments, the method further comprises receiving a second data message including instructions from the electronic device to return the entire selected audio content item; retrieving the entire selected audio content item from a second storage; encrypting the entire retrieved audio content item; and transmitting the encrypted audio content item to the electronic device. In some embodiments, the first storage and the second storage are a same storage. In alternative embodiments, the first storage and the second storage are different storages, which are separate from each other.

In some embodiments, analyzing audio content of the retrieved audio content item to locate a portion of the selected audio content item to be used as the preview segment comprises analyzing the audio content from only a portion of the retrieved audio content item. Said portion of the retrieved audio content item may comprise a portion having a predefined duration. This predefined duration may for example be 30 seconds, 60 seconds or 90 seconds. Furthermore, said portion may be a portion at the beginning of the retrieved audio content item.

In some embodiments, analyzing audio content of the retrieved audio content item comprises: evaluating an audio pattern of the audio content item; and locating said portion of the selected audio content item to be used as the preview segment based on the evaluation of the audio pattern. In one embodiment, the method comprises evaluating amplitude variations of the audio content item; and locating said portion of the selected audio content item to be used as the preview segment based on the evaluation of the amplitude variations. For example, the method may comprise evaluating amplitude variations of the audio content item only for a pre-defined duration at the beginning of the audio content item; and locating said portion of the selected audio content item to be used as the preview segment by identifying a location of the audio content item where the amplitude changes drastically, i.e. where the amplitude changes from a lower amplitude value to a considerably higher amplitude value within a predefined period of time.

In some embodiments, the method comprises dividing the audio content item into several equally-sized segments of predefined duration; comparing the audio patterns of said equally-sized segments of the audio content item; identifying those equally-sized segments that have same or similar audio patterns; grouping the equally-sized segments into groups, wherein each group comprises one or several equally-sized segments having the same or similar audio pattern; for each group of equally-sized segments, counting the number equally-sized segments having the same or similar audio pattern; establishing the group that has the highest number of equally-sized segments having the same or similar audio patterns; and interpreting the group having the highest number of equally-sized segments with the same or similar audio patterns to represent a most interesting part of the audio content item; wherein locating said portion of the selected audio content item to be used as the preview segment comprises locating any one of the segments of the group having the highest number of equally-sized segments and using the thus located segment as the preview segment. In one embodiment, comparing the audio patterns of said equally-sized segments of the audio content item comprises comparing amplitudes of said equally-sized segments of the audio content item; and identifying those equally-sized segments that have same or similar audio patterns comprises identifying those equally-sized segments that have same or similar amplitude values.

According to a second aspect, a computer server system is provided. The computer server system is configured to perform, or otherwise execute, the method of the first aspect.

In some embodiments, the computer server system comprises one or several computer servers, which include(s) means adapted to perform the method of the first aspect.

In one example implementation, the computer server system comprises one or several processing units adapted to perform the method of the first aspect.

In another example implementation, the computer server system comprises one or more processors; and memory storing one or more programs for execution by the one or more processors, the one or more programs including instructions for performing the method of the first aspect.

According to a third aspect, a computer readable storage medium storing one or more programs is provided. The one or more programs comprises instructions, which, when executed by a computer server system having one or several computer servers with one or more processors, cause the computer server system to perform the method of the first aspect.

According to a fourth aspect, a method performed by an electronic device for playback of an audio content item is provided. The method comprises receiving a first request to play a selected audio content item (e.g., at a user interface of the electronic device); in response to receiving the first request, transmitting a first data message comprising instructions to a computer server system to return a preview segment associated with the selected audio content item, the preview segment being a portion of the selected audio content item; receiving an unencrypted preview segment from the computer server system; in response thereto playing the unencrypted preview segment (e.g., at the user interface of the electronic device); receiving a second request to continue playing the selected audio content item; in response to receiving the second request, transmitting a second data message comprising instructions to the computer server system to return the selected audio content item; receiving the selected audio content item as an encrypted audio content item; in response thereto decrypting the received audio content item; and playing the thus decrypted audio content item (e.g., at the user interface of the electronic device).

According to a fifth aspect, an electronic device is provided. The electronic device is configured to perform, or otherwise execute, the method of the fourth aspect.

In some embodiments, the electronic device comprises means adapted to perform the method of the fourth aspect.

In one example implementation, the electronic device comprises an electronic device, including a processing unit adapted to perform the method of the fourth aspect.

In another example implementation, the electronic device comprises one or more processors; and memory storing one or more programs for execution by the one or more processors, the one or more programs including instructions for performing the method of the fourth aspect.

In some embodiments, the electronic device is a stationary electronic device, such as a stationary computer.

In other embodiments, the electronic device is a portable electronic device, such as a mobile telephone, a cellular telephone, a tablet computer, a laptop computer, a personal digital assistant.

According to a sixth aspect, a computer readable storage medium storing one or more programs is provided. The one or more programs comprises instructions, which, when executed by a computer server system having one or several computer servers with one or more processors, cause the computer server system to perform the method of the first aspect.

Various embodiments described herein allow for quickly and efficiently browse, or scan through, a multitude of selectable audio content items at an electronic device by listening to shorter preview segments of selected audio content items. At the same time, the various embodiments described herein allow for a sufficient protection against unauthorized use of the audio content provided by the content owners.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

Figure 1:
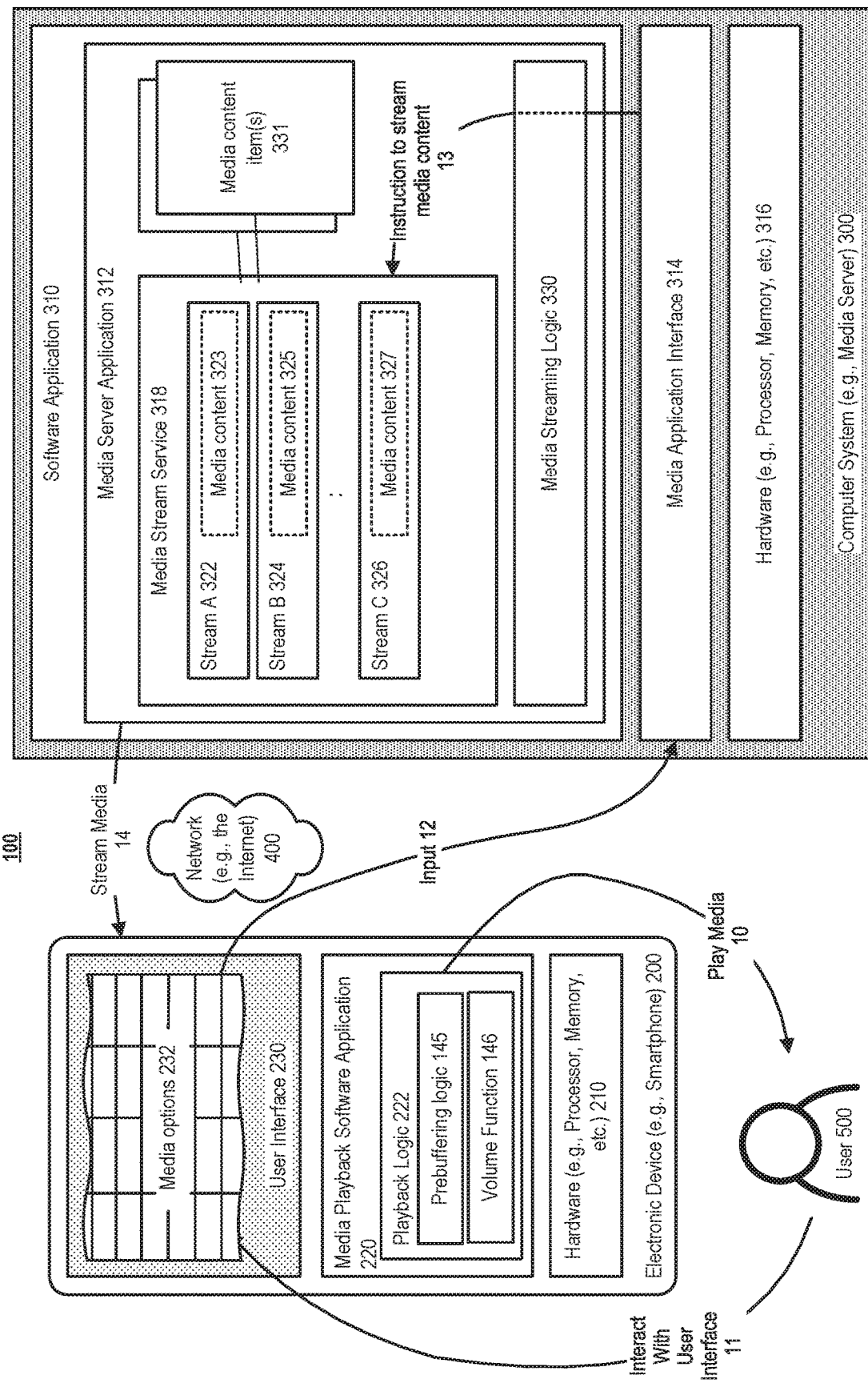
FIG. 1 illustrates a system for playback of video content, in accordance with an embodiment.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for playback of audio content items may be inadequate. It is a general object of the embodiments described herein to allow for an improved playback of audio content when the audio content is streamed to the electronic device. More particularly, embodiments disclosed herein addresses how to allow users of electronic devices to quickly and efficiently browse, or scan through, a multitude of selectable audio content items while, at the same time, allowing for a sufficient protection of the audio content provided by the content owners.

To address this, in accordance with an embodiment, described herein are a method and a computer server system for streaming an audio content item to an electronic device. A first data message comprising instructions from an electronic device to return a preview segment associated with a selected audio content item is received from the electronic device. In response, the selected audio content item is retrieved, or otherwise fetched, from a first storage. Also, audio content of the retrieved audio content item is analyzed in order to locate a portion of the selected audio content item to be used as the preview segment. Once located, this located portion of the selected audio content item is extracted from the retrieved audio content item. Subsequently, the extracted portion of the selected audio content item is transmitted, i.e. sent, unencrypted to the electronic device This way, the electronic device may receive an unencrypted preview segment, which is a shorter preview version of the selected audio content item. This disclosure recognizes the fact that most content owners would accept that shorter versions (e.g., in the form the preview segments, or samples) of the entire content have comparatively less protection against unauthorized use for the benefit of giving the users the freedom of previewing a portion of the selected audio content item. Since the preview segments are received unencrypted, the electronic device does not need to decrypt the received preview segment. This may save the resource usage (e.g., battery consumption, processor capacity, etc.) of the electronic device. Also, the provision of smaller unencrypted preview segments of the audio content items may allow for a reduction in the required loading times for playback of preview segments and, simultaneously, allow for an uninterrupted user experience. The described approach also recognizes that the playback of a smaller unencrypted preview segment may have the psychological effect that the users will perceive the playback of these smaller preview segments as if the smaller preview segment is being played back at the user interface immediately. In other words, from the user's perception the playing back of the preview segments, i.e., the audio content item samples, seems immediate.

Furthermore, it is advantageous that the audio content of the retrieved audio content item is analyzed in order to locate the portion of the selected audio content item that is to be used as the preview segment. For example, it may be possible to locate a portion the selected audio content item that is a good representation of the entire selected audio content item, or a portion which is represents an interesting portion of the selected audio content item. By locating a good representation of the entire selected audio content item, or a portion which represents an interesting portion of the selected audio content item, a user's browsing of a multitude of audio content items may be facilitated in that the user may find what he or she is looking for quicker.

FIG. 1 illustrates an example environment where embodiments of the present invention may be applied. With continued reference to FIG. 1, an example system 100 for playback of media content will therefore now be described in further detail. The system 100 may comprise an electronic device 200 and a computer system 300 operating as a media server. The electronic device 200 may be communicatively connectable to the computer system 300 via a network 400, such as the Internet, as is conventional and known in the existing art. As can be seen in FIG. 1, only a single electronic device 200 and a single computer system 300 are shown. However, the computer system 300 may support the simultaneous use of multiple electronic devices, and/or the electronic device 200 can simultaneously access media content at multiple computer systems.

In the following description and in order not to obscure the detailed description with unnecessary detail, the media content will generally be exemplified to be audio content, e.g. in form of music. This should, however, not be interpreted as limiting the scope of the various embodiments of the disclosed embodiments.

As shown in FIG. 1, the electronic device 200 may be used for the playback of audio content such as music, which is provided by the computer system 300. The electronic device 200 may be a mobile telephone, such as a smart phone. Alternatively, the electronic device 200 may be a tablet computer. In yet other embodiments, the electronic device 200 may be any other electronic device capable of playback of media content such as, for example, one of the electronic devices of the following group: a personal computer, a laptop, and a mobile electronic device (e.g. a handheld entertainment device, a digital media player, or other media device).

The electronic device 200 may include one or several physical computer resources, or hardware resources 210. The hardware resources 210 may e.g. include one or several processors (or, processing circuitry), a communications interface (or, communication circuitry) and one or several memories. Likewise, the computer system 300 operating as a media server may include one or several physical computer resources, or hardware resources 316. The hardware resources 316 may likewise include e.g. include one or several processors (or, processing circuitry), a communications interface (or, communication circuitry) and one or several memories.

The computer system 300 may include an operating system or other processing system which supports execution of a software application 310, including a media server application 312 which may be used, for example, to stream media content. A media stream service 318 may be used to buffer media content, for streaming to one or more media streams 322, 324, 326. A media application interface 314 may receive requests from electronic devices 200 or other systems, to retrieve media content 331 from the computer system 300.

Media content 331, or media items, may be provided, for example, within a first storage such as a memory (e.g., including a database), or may be received by the computer system 300 from another source (not shown). This another source (not shown) could be external to the computer system 300, i.e. it may be located remotely from the computer system 300.

A media streaming logic 330 may be used to retrieve or otherwise access the media content 331 in response to requests from electronic devices 200 or other systems, and populate the media stream service with streams 322, 324, 326 of corresponding media content data 323, 325, 327 that may be returned, i.e. streamed, to the requesting electronic device 200.

The electronic device 200 comprises a user interface 230, which is adapted to display or otherwise provide a visual array of media options 232, for example as a two-dimensional grid, a list, or other visual array format, and determine a user input. Each media option in the visual array of media options 232 correspond to a respective media stream 322, 324, 326.

Selecting a particular media option within the visual array 232 may be used, or otherwise interpreted, as a request or instruction to the media server application 312 to stream or otherwise return a corresponding particular media content item. For example, in accordance with some embodiments, the software application 310 at the computer system 300 may be used to stream or otherwise communicate media content to the electronic device 200, wherein the user interface 230 at the electronic device 200 is adapted to display a plurality of media options that correspond to respective media streams.

In accordance with some embodiments, the electronic device 200 may also include a media playback application 220, together with a playback logic 222, pre-buffering logic 145, and a volume function 145, which may be used to control the playback of media content that is received from the media server application 312, for playback by the electronic device 200, as described in further detail below.

A user 500 may interact 11 with the user interface 230 and issue requests, for example the playing of a selected media option at the electronic device 200. The user's selection of a particular media option may be communicated 12 to the media server application 312, via the media application interface 314. The media server application 312 may then be instructed 13 to stream corresponding media content, including one or more streams of media content data 323, 325, 327, and subsequently stream 14 or otherwise communicate the selected media to the user's electronic device 200. In accordance with some embodiments, pre-buffering requests from the electronic device 200 may also be communicated 12 to the media server application 312 via the media application interface 314. At the electronic device 200, in response to the user's interaction with the user interface 230, the media playback application 220, including the playback logic 222, may play 10 the requested media content to the user 500.

Figure 2:
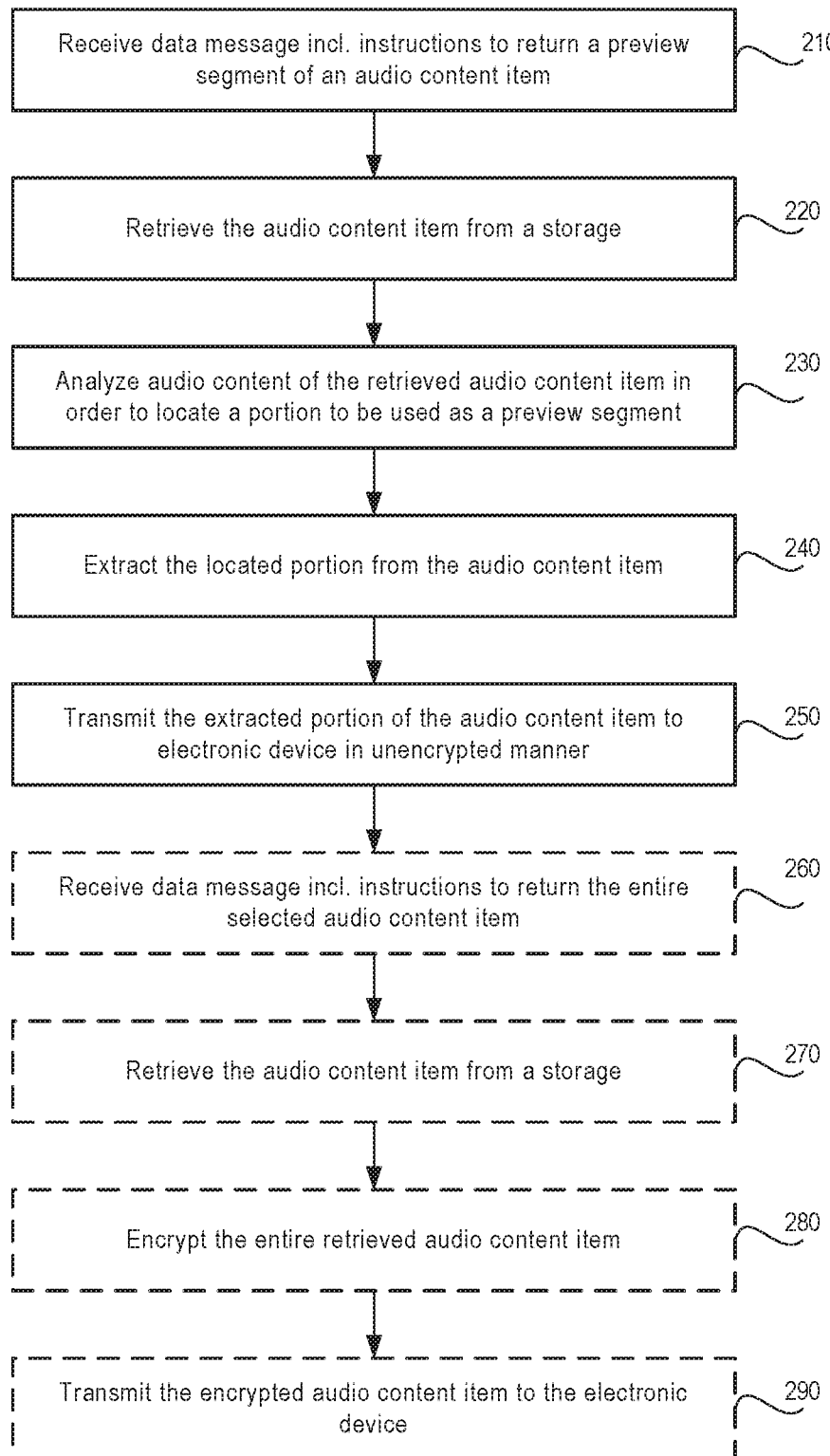
FIG. 2 illustrates a flowchart of a method in accordance with an embodiment.

FIG. 2 illustrates an example embodiment of a method for streaming an audio content item to an electronic device 200. The method may be performed by, or otherwise executed in, a computer server system 300 (see FIG. 1). In some embodiments, the computer server system is implemented by one single computer server. In other embodiments, the computer server system is implemented by two or more computer servers, i.e. the method is performed by several computer servers in a distributed manner.

As can be seen in FIG. 2, a first data message is received 210, or otherwise obtained. This first data message comprises instructions from the electronic device 200 to return a preview segment associated with a selected audio content item. The preview segment is a portion, or part, of the selected audio content item. The preview segment can thus be regarded as a sample of the selected audio content item.

Upon receipt of the first data message, the selected audio content item is retrieved 220 from a first storage 331, e.g. a memory. The first storage may be an internal storage of the computer server system 300. Alternatively, the first storage may be an external storage, which is accessible by the computer server system 300.

Advantageously, but not necessarily, retrieving 220 the selected audio content item from the first storage may comprise retrieving the entire selected audio content item from the first storage.

Once retrieved 220, the audio content of the retrieved audio content item is analyzed 230 in order to locate a portion of the selected audio content item to be used as the preview segment. In other words, the portion to be used as the preview segment, or sample, is located on the basis of an audio analysis of the retrieved audio content item. This audio analysis may be performed in many different ways. Some examples will be explained in further detail herein below.

In some embodiments, only a portion (e.g., a predefined portion) of the retrieved audio content item is analyzed. That is, it is not necessary to analyze the audio pattern of the entire selected audio content item. In one embodiment, this portion of the retrieved audio content item is a portion having a predefined duration. The predefined duration may, for example, be 5 seconds, 10 seconds, 15, seconds, 20 seconds, 30 seconds, 60 seconds or 90 seconds. In some embodiments this portion is a portion at the beginning of the retrieved audio content item such as, e.g., the initial 30 seconds of the audio content item.

After the portion to be used as the preview segment has been located 220, or identified, this located portion of the selected audio content item is extracted 240 from the retrieved audio content item.

Following the extraction 240 of the located portion, this extracted portion of the audio content item can be transmitted, e.g. streamed, unencrypted to the requesting electronic device.

Hereby it is made possible for the electronic device 200 to receive an unencrypted preview segment, which is a shorter preview version of the selected audio content item. Since the preview segments are received unencrypted, the electronic device 200 does not need to decrypt the received preview segment. This may save the resource usage (e.g., battery consumption, processor capacity, etc.) of the electronic device 200. Furthermore, it is advantageous that the audio content of the retrieved audio content item is analyzed in order to locate a portion of the selected audio content item to be used as the preview segment. For example, it may be possible to locate a portion the selected audio content item that is a good representation of the entire selected audio content item, or a portion which represents an interesting portion of the selected audio content item. By locating a good representation of the entire selected audio content item, or a portion which represents an interesting portion of the selected audio content item, a user's browsing of a multitude of audio content items may be facilitated in that the user may find what he or she is looking for quicker.

With continued reference to FIG. 2, upon a user's further selection at the electronic device 200 to play the entire selected audio content item, the method may additionally comprise receiving 260 a second data message including instructions from the electronic device 200 to return the entire selected audio content item. In response to receiving 260, or otherwise obtaining, the second data message, the entire selected audio content item can be retrieved 270 from a second storage. In some embodiments, the first storage and the second storage are the same storage. In alternative embodiments, the first storage and the second storage are different storages located separately from each other. Furthermore, the entire retrieved audio content item is encrypted 280. Once encrypted, the encrypted audio content item can be transmitted 290, e.g. streamed, to the requesting electronic device.

It should be appreciated that, in some embodiments, where the method of FIG. 2 is implemented in a distributed computer server system solution, a first computer server may be configured to perform, or otherwise execute, the actions 210 through 250, whereas a second computer server may be configured to perform, or otherwise execute, the actions 260 through 290. Thus, the first computer server may for example be a dedicated server which is dedicated to provide smaller unencrypted portions, i.e. preview segments, to requesting electronic devices 200. Also, the second computer server may for example be a dedicated server which is dedicated to provide the entire selected audio content items to the requesting electronic device 200 upon a user's further selection to play the whole content of the selected audio content item. A distributed computer server system solution may have the advantage of task sharing among the different computer servers that are involved such that the different computer servers perform different actions, or method steps, of the method shown in FIG. 2.

Figure 3A:
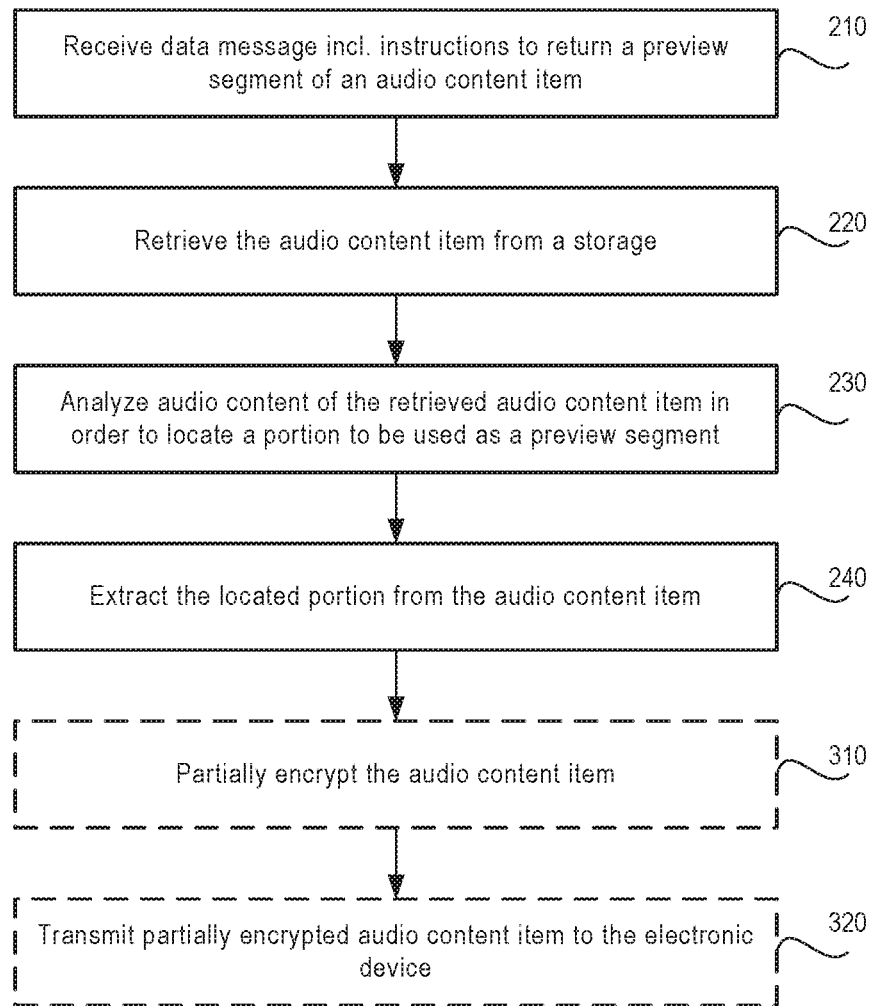
FIGS. 3A-3B illustrate flowcharts of a method in accordance with an embodiment.
Figure 3B:
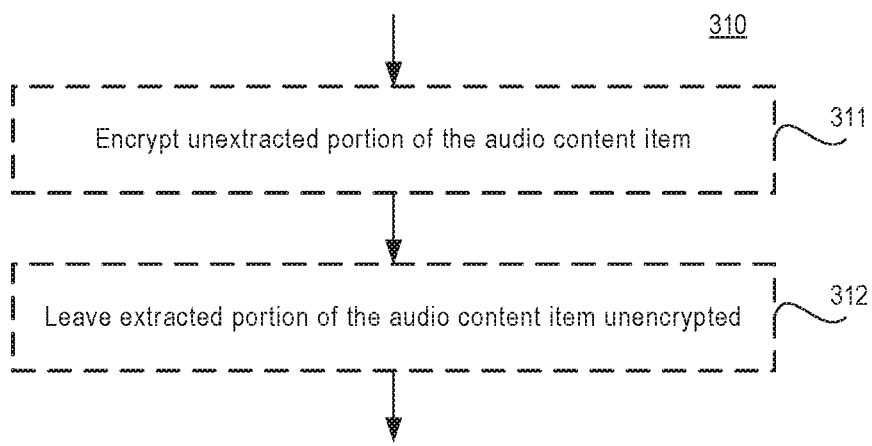

FIGS. 3A-3B illustrate another example embodiment of a method for streaming an audio content item to an electronic device. Those method steps, or actions, that are the same or similar as in the embodiment shown in FIG. 2 will not be repeated here. As can be seen in FIG. 3A, the method may further comprise partially encrypting 310 the selected audio content item. As can be seen in FIG. 3B, partially encrypting 310 the selected audio content item may comprise encrypting 311 an unextracted portion of the audio content item (i.e., the remaining portion, or part, of the audio content item after the located portion having been extracted 240), and leaving 312 the extracted portion of the selected audio content item unencrypted. In FIG. 3B, the actions, or method steps, 311 and 312, respectively, are schematically illustrated in a certain order. It will be appreciated that the reverse order is equally possible, i.e. the extracted portion of the selected audio content item is left 312 unencrypted first and, subsequently, the unextracted portion is encrypted 311. In response to the selected audio content item having been partially decrypted, the partially encrypted audio content item can be transmitted 320, e.g. streamed, to the requesting electronic device.

A partial encryption of the audio data stream can thus be provided such that certain content (i.e., the unextracted portion) of the audio content item is encrypted, while other content (i.e., the smaller extracted portion) remains unencrypted so that access to, for example, the unencrypted portion of the audio content item can be provided without compromising protection of the remaining portion of the audio content item. In other words, a selective partial encryption of the audio content item can be provided. Hereby it is made possible for the electronic device to receive the unencrypted preview segment as well as a remaining encrypted portion of the selected audio content item at once. Since the preview segments are received unencrypted, the electronic device does not need to decrypt this portion of the selected audio content item. This may save the resource usage (e.g., battery consumption, processor capacity, etc.) of the electronic device when playing the preview segments of a selected audio content item. Also, it is not necessary for the electronic device to begin decrypting the encrypted portion of the received audio content item until the electronic device receives an instruction, or otherwise recognizes, that the user wishes to play the entire selected audio content item.

Figure 4:
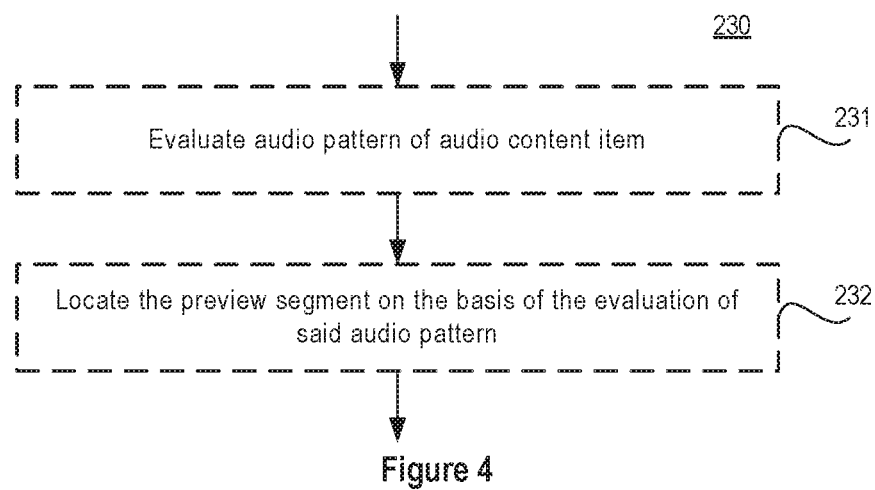
FIG. 4 illustrates a flowchart of a method in accordance with an embodiment.
Figure 5:
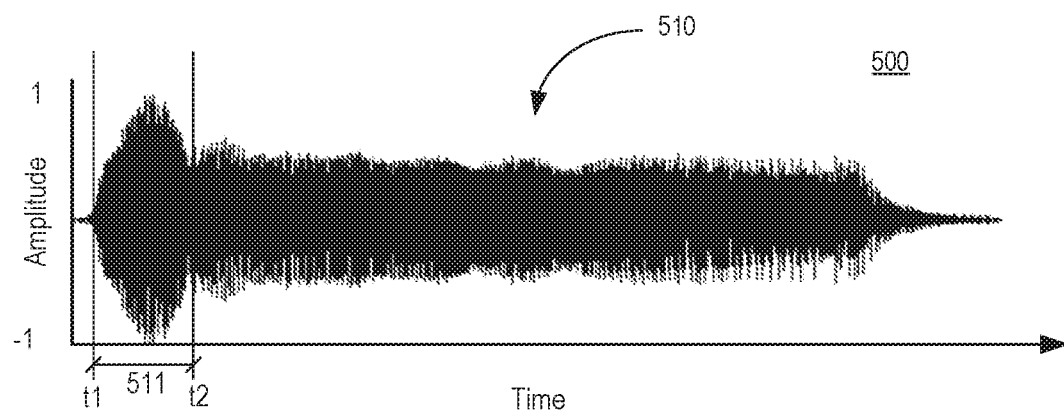
FIG. 5 schematically illustrates an example time-domain representation of a waveform of an audio content item.

Turning now to FIGS. 4 and 5, respectively, an example procedure for analyzing 230 (see FIGS. 2 and 3A) the audio content of the retrieved audio content item to locate the portion of the selected audio content item to be used as the preview segment will be described in some more detail.

FIG. 4 schematically illustrates an example procedure of analyzing audio content of the retrieved audio content item. The audio pattern of the audio content item is evaluated 231. Subsequently, the portion of the selected audio content item that is to be used as the preview segment is located 232, thus identified, based on the evaluation of the audio pattern. For example, in one embodiment, amplitude variations of the audio content item are evaluated 231. If so, the portion of the selected audio content item that is to be used as the preview segment is located 232, thus identified, based on the evaluation of amplitude variations.

FIG. 5 schematically illustrates an example of a time-domain illustration 500 of a waveform of an audio content item in the form of a song. A time-domain illustration, or representation, of the audio content item can illustrate the amplitude variations of the audio content item at different points in time. Assume that a selected audio content item has an audio pattern 510, as is illustrated in FIG. 5. The amplitude variations of the audio content item, in this example an exemplary song, can be evaluated 231. Based on the evaluation 231, it is possible to select which portion of the audio content item that is to be used as the preview segment (that is to be extracted 240 from the audio content item in a subsequent method step, or action). This approach recognizes the fact that many songs show an amplitude variation characteristic where the amplitude variations increase from a relatively low level to a comparatively much higher level. For example, with continued reference to FIG. 5, it is possible to establish, or otherwise conclude, that the amplitude variations increase at a time t1, or more specifically slightly after t1. This point in time, i.e. t1, may then be used, or otherwise, interpreted by the computer server system to indicate a starting point of the portion that will be used as the preview segment. In other words, an increase of amplitude variations may be used to locate a starting point of the portion 511 that will be used as the preview segment. Once the starting point t1 has been located, thus identified, it is possible to establish the ending time of the portion 511 that will be used as the preview segment. This ending time of said portion 511 may be selected to be at a time t2. The time t2 may, for example, be selected such that the period of time between t2 and t1 (i.e., $\Delta t = t2 - t1$) has a predefined duration, e.g. 5 seconds, 10 seconds, 15, seconds, 20 seconds, 30 seconds, 60 seconds or 90 seconds. In alternative embodiments, $\Delta t$ has no predefined duration. Rather, the point of time t2 may for example be selected to be at a different time, e.g. where the amplitude variations begin to decrease after a preceding increase.

Figure 6:
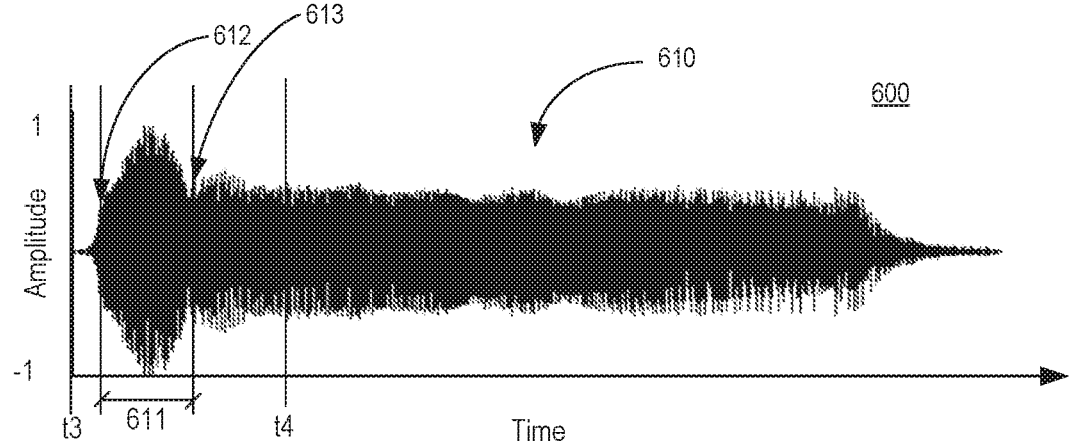
FIG. 6 schematically illustrates an example time-domain representation of a waveform of an audio content item.

Another embodiment, which will be described in connection with FIG. 4 and FIG. 6, includes evaluating 231 amplitude variations 610 of the audio content item only for a pre-defined duration (here exemplified by $\Delta t = t4 - t3$) at the beginning of the audio content item. For example, the pre-defined duration at the beginning of the audio content item may be 5 seconds, 10 seconds, 15 seconds, 20 seconds, 30 seconds, 60 seconds or 90 seconds. Furthermore, the portion 611 of the selected audio content item to be used as the preview segment can be located (within $\Delta t = t4 - t3$) by identifying a location 612 of the audio content item where the amplitude changes drastically, i.e. a location where the amplitude changes from a lower amplitude value to a considerably higher amplitude value within a predefined period of time, which predefined period of time is typically relatively short such as 0.2 seconds, 0.5 seconds, 1 second, 2 seconds or 5 seconds. This location 612, may then be used, or otherwise, interpreted by the computer server system to indicate a starting point of the portion 611 that will be used as the preview segment. In other words, a drastic amplitude change may be used, or otherwise interpreted, by the computer server system to locate a starting point of the portion 611 that will be used as the preview segment. Once the starting point 612 has been located, thus identified, it is possible to establish the ending time of the portion 611 that will be used as the preview segment. This ending time of said portion 611 may be selected to be at a location 613. The ending time 613 may, for example, be selected such that the period of time between starting time 612 and the ending time 613 has a predefined duration, e.g. 5 seconds, 10 seconds, 15, seconds, 20 seconds, 30 seconds, 60 seconds or 90 seconds. In alternative embodiments, the period of time between starting time 612 and the ending time 613 has no predefined duration. Rather, the ending time 613 may for example be selected to be at a different time, e.g. when another drastic amplitude change occurs and is detected.

Figure 7:
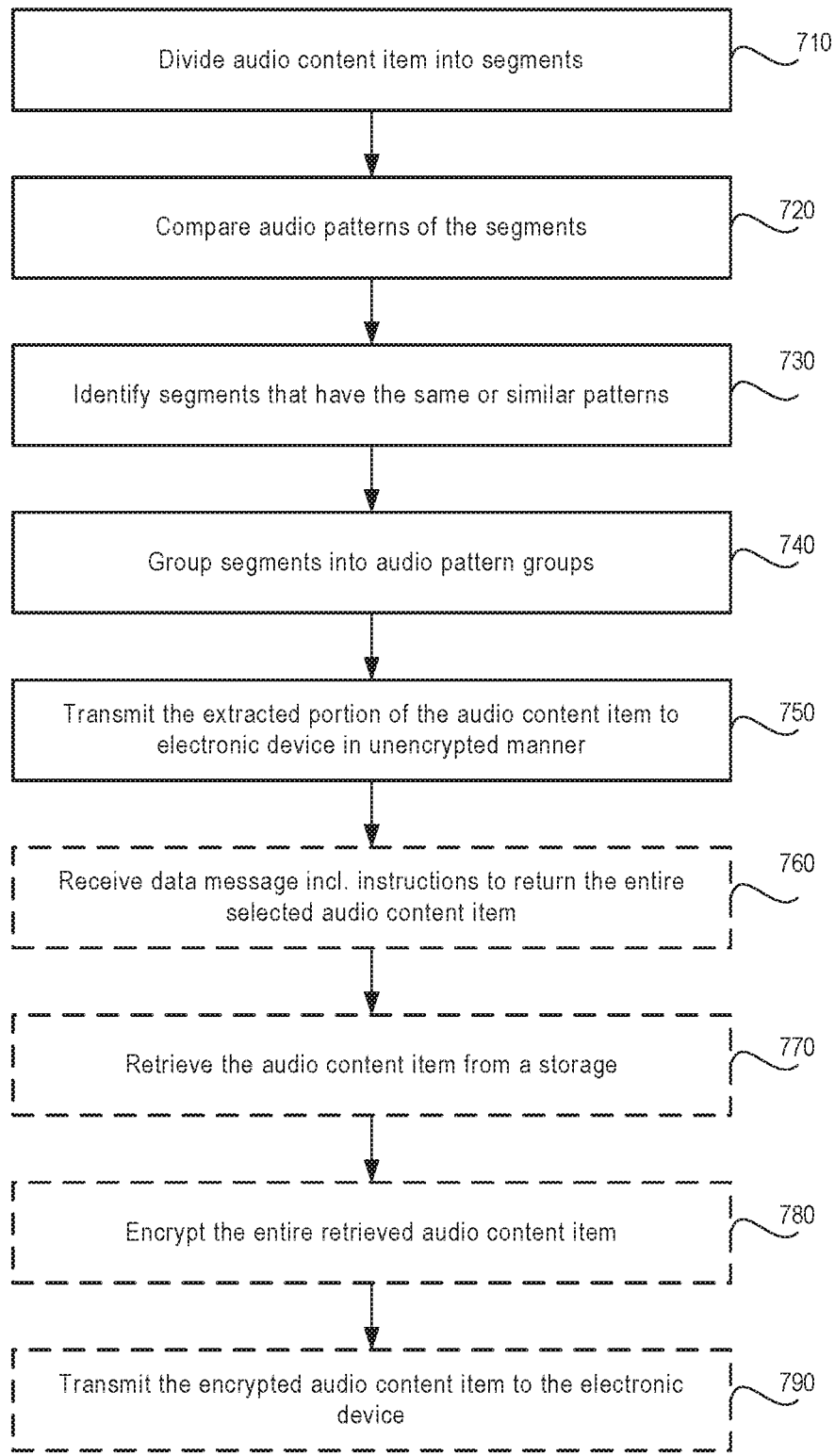
FIG. 7 illustrates a flowchart of a method in accordance with an embodiment.
Figure 8:
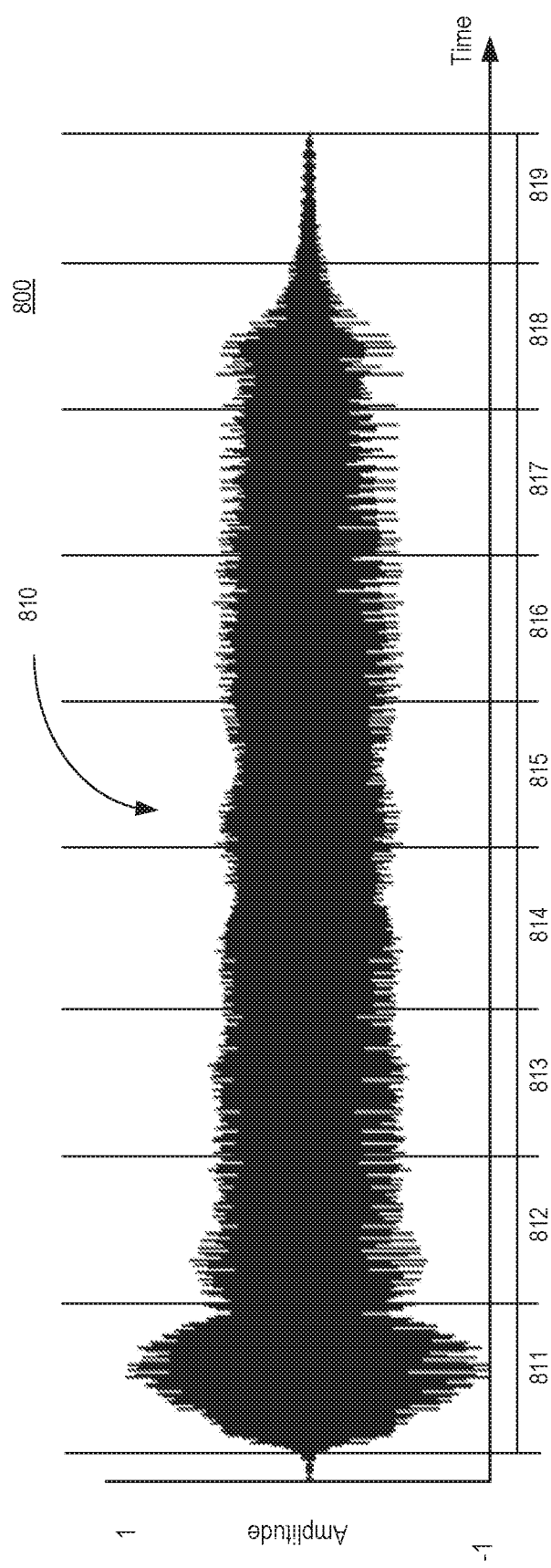
FIG. 8 schematically illustrates an example time-domain representation of a waveform of an audio content item.

Turning now to FIGS. 7 and 8, respectively, still another example procedure of analyzing 230 audio content of the retrieved audio content item will be described. As is illustrated in FIG. 7, a selected audio content item can be divided 710 into several equally-sized segments 811-819 of pre-defined duration. The pre-defined duration may for example be 5 seconds, 10 seconds, or 15 seconds, 20 seconds, 30 seconds, 60 seconds, or 90 seconds. The audio patterns of the segments 811-819 can be compared 720. In some embodiments, the comparison 720 comprises comparing amplitudes of the segments of the audio content item.

Furthermore, those segments that have the same or similar audio patterns can be identified 730. In some embodiments, this identification 730 comprises identifying those equally-sized segments that have same or similar amplitude values. For example, in the example shown in FIG. 8, segments 813, 816 and 817 may be said to have similar audio patterns. Likewise, segments 814 and 815 may be said to have similar audio patterns. The remaining segments have audio patterns that are not necessarily common, or similar, with other segments.

Once identified 730, the segments 811-819 can be grouped into groups based on the similarity of audio patterns. In other words, the segments may be grouped into audio pattern groups, wherein each audio pattern group comprises one or several equally-sized segments having the same or similar audio pattern. Table 1 herein below shows one example table where the segments of FIG. 8 are grouped into different audio pattern groups A through F, e.g. in a look-up table.

TABLE 1

Example grouping of segments.

| Audio pattern group | Segments |
|---|---|
| A | 811 |
| B | 812 |
| C | 813, 816, 817 |
| D | 814, 815 |
| E | 818 |
| F | 819 |

Moreover, for each group of the audio pattern groups A-F, the number of segments can be counted 750. Continuing with the example of Table 1, Table 2 illustrates the number of segments for each audio pattern group.

TABLE 2

Number of segments in each group.

| Audio pattern group | Segments | Number of segments |
|---|---|---|
| A | 811 | 1 |
| B | 812 | 1 |
| C | 813, 816, 817 | 3 |
| D | 814, 815 | 2 |

TABLE 2-continued

Number of segments in each group.

| Audio pattern group | Segments | Number of segments |
|---|---|---|
| E | 818 | 1 |
| F | 819 | 1 |

Based on the counting 750, it is further possible to establish 760, or otherwise conclude, which of the audio patterns group A-F that has the highest number of segments with the same or similar audio patterns. In the example shown in Table 2, group C has the highest number of segments with the same or similar audio patterns. Next, the group having the highest number of segments with the same or similar audio patterns (i.e., group C in this example) is interpreted 770 to represent a most interesting part of the audio content item. According to some embodiments, in the event that more than one group have the highest (and, thus, the same) number of segments with the same or similar audio patterns, one of the groups may be randomly selected and interpreted 770 to represent a most interesting part of the audio content item. According to other embodiments, in the event that more than one group have the highest (and the same) number of segments with the same or similar audio patterns, a further audio analysis may be performed for the segments of those groups. Based on this further audio analysis, one of the groups may be selected and interpreted 770 to represent a most interesting part of the audio content item. For instance, a group including segments that show the highest amplitude variations could be selected in favor of other groups. This is only a mere example. Those skilled in the art would realize that other criteria are also conceivable.

Locating 230 the portion of the selected audio content item to be used as the preview segment may then comprise locating any one of the segments of the group having the highest number of segments (i.e., group C in this example) and using the thus located segment as the preview segment. For example, in the example hereinabove, it would be possible to find the segments 813, 816 and 817 of group C in the look-up table that is schematically illustrated in Table 1 hereinabove. Next, one of these found segments 813, 816, 817 is selected, and subsequently, used as the preview segment. The selection of one of the segments 813, 816, 817 may be made randomly. Alternatively, in other embodiments, it is possible to perform an audio analysis of neighboring segments (i.e., segments 812 and 814 neighboring segment 813, segments 815 and 817 neighboring segment 816, and segments 816 and 818 neighboring segment 817) and utilize this further audio analysis for the selection of one of the segments in said group (i.e., group C in this example).

Figure 9:
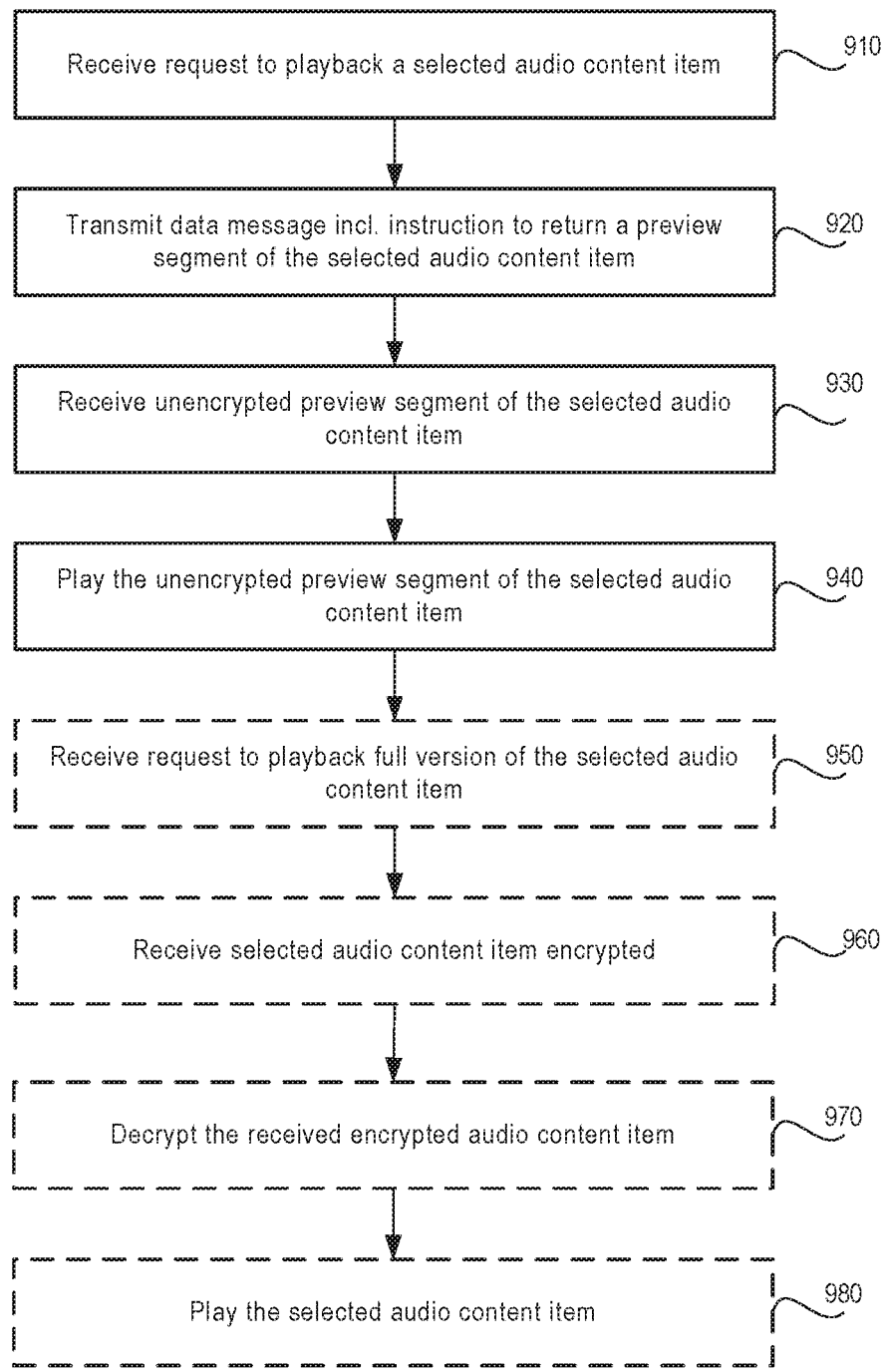
FIG. 9 illustrates a flowchart of a method in accordance with an embodiment.

With reference to FIG. 9 and FIG. 10A-C, respectively, an example embodiment of a method for playback of an audio content item will be described. FIG. 9 illustrates a flowchart of the method according to an embodiment and FIG. 10 illustrate an example of a user interface 230 of the electronic device 200, which supports playback of the audio content item in accordance with said embodiment. The electronic device 200 which is schematically illustrated in FIG. 10 hence comprises a user interface 230.

The user interface 230 typically includes output device(s) and input device(s), as is known and conventional in the art. In some implementations, the input devices may include a keyboard, a mouse or a track pad. Alternatively, or in addition, in some implementations, the user interface 230 includes a display that includes a touch-sensitive surface, in which case the display is a touch-sensitive display. The touch-sensitive display is adapted to detect or otherwise determine a user input. In electronic devices 200 that have a touch-sensitive display, a soft keyboard may be displayed when keyboard entry is needed. A soft keyboard is a keyboard that replaces the physical keyboard on electronic devices 200 having touch-sensitive displays. Hence, in electronic devices 200 that have a touch-sensitive display a physical keyboard is optional. The output devices may for example include one or more speakers and/or one or more audio output connections for connecting to external speaker(s), headphones or earphones. Optionally, the input devices may further include an audio input device (e.g., a microphone) to capture audio (e.g., speech). Still further, the input devices may also optionally comprise audio recognition device(s) to recognize audio (e.g., speech), which in combination with a microphone, may for example supplement or replace the keyboard.

As is schematically illustrated in FIG. 10, the user interface 230 includes a display, which is adapted to display or otherwise provide a visual array of media options A-O (601-615), for example as a two-dimensional grid, a list, or other visual array format. As is also schematically illustrated in FIG. 10, the plurality of media options A-O may for example be displayed as an array of image tiles 650. An image tile 650 may be embodied as a card at the display. For example, a card may include an image, which is related to the media option in question. An example of such an image could be an album cover or the like. Each image tile 650 may further include metadata related to the media option in question. This metadata may thus comprise information or data about the media option in question. As such, the metadata may include information such as genre, artist, title of the song, etcetera.

In this example, each media option A-O in the visual array of media options correspond to a respective audio content item, e.g. a song. Each audio content item may be provided to the electronic device in the form of an audio stream. In other words, each media option A-O in the visual array of media options can be said to correspond to a respective audio content item, which in turn correspond to a respective audio stream 322, 324, 326 (see FIG. 1).

Figure 10A:
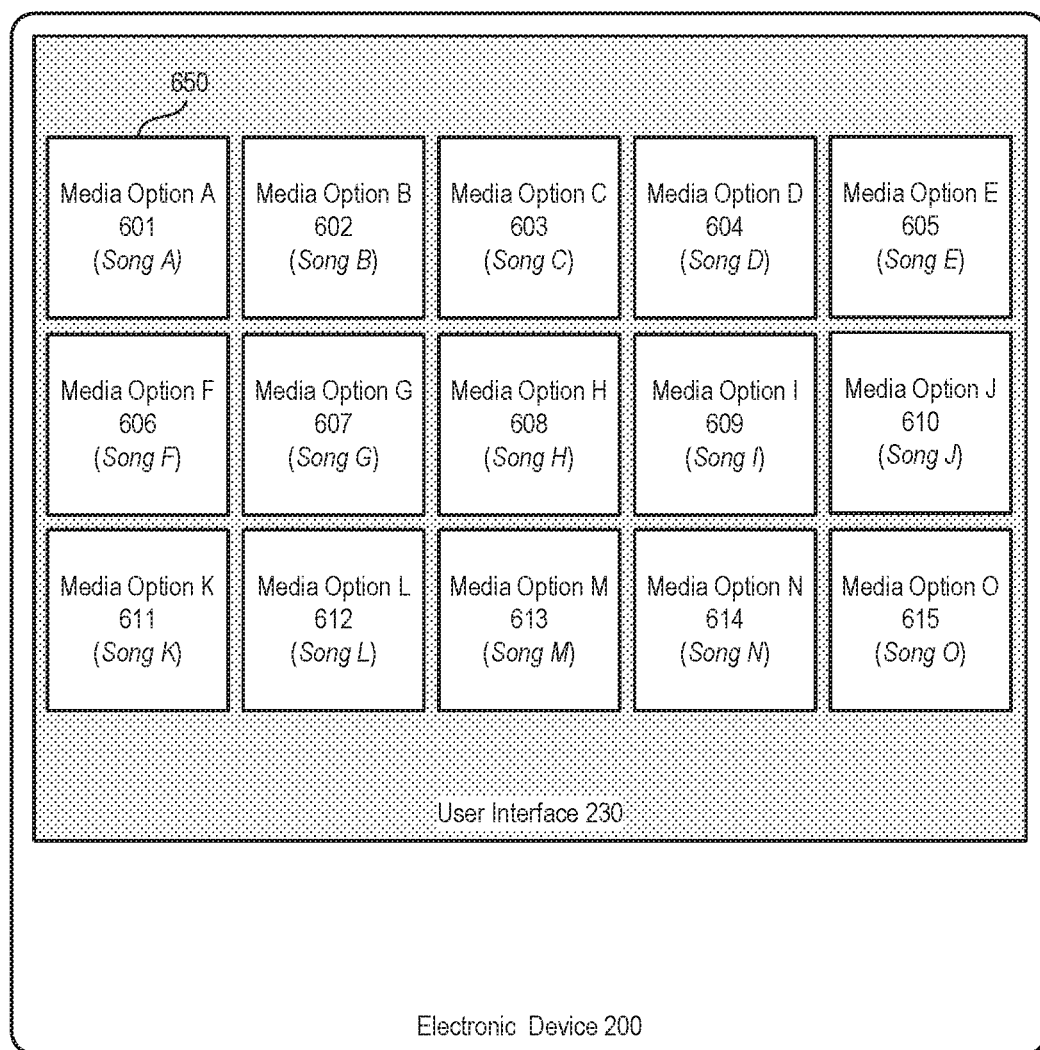
FIGS. 10A-10C schematically illustrates an example embodiment of a user interface of an electronic device, e.g. in the form of a tablet computer, which supports playback of an audio content item.
Figure 10B:
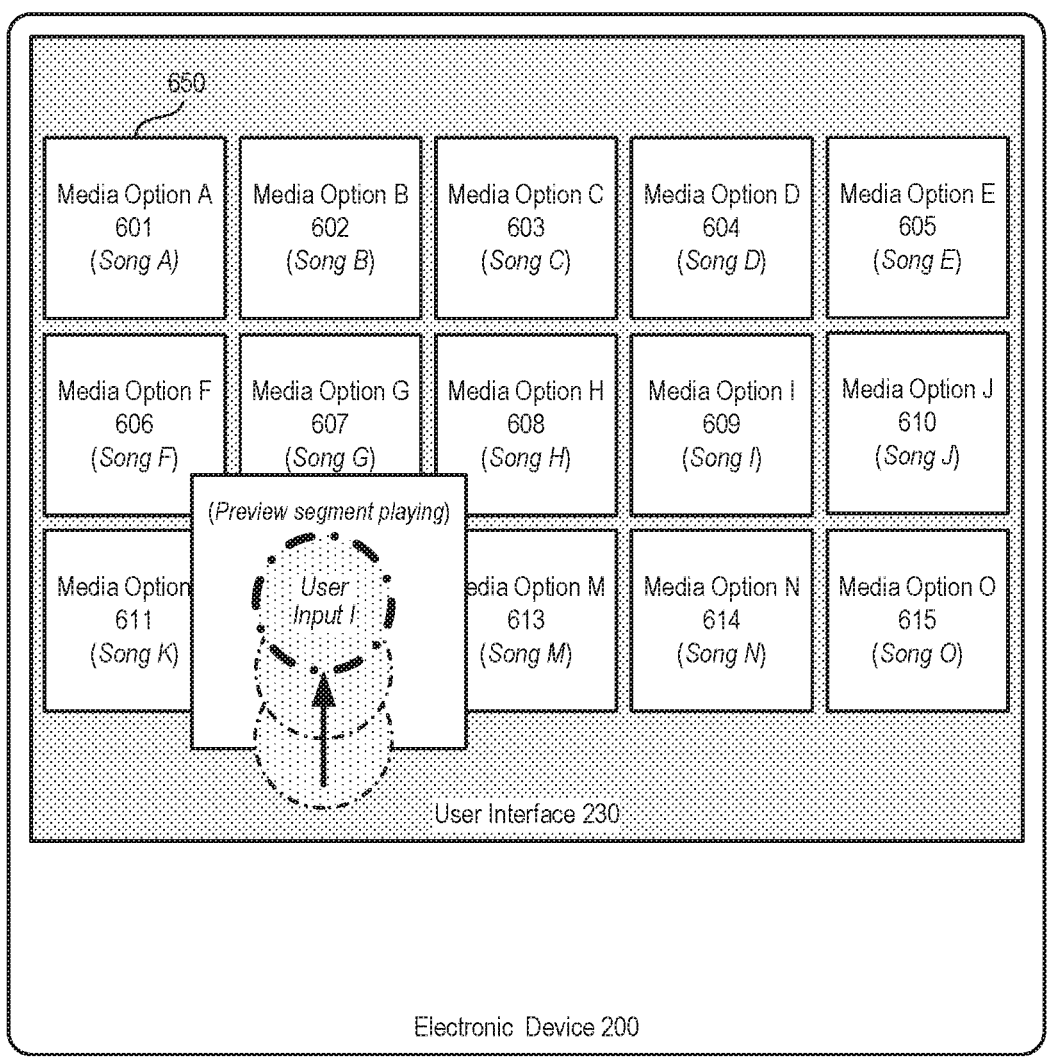
Figure 10C:
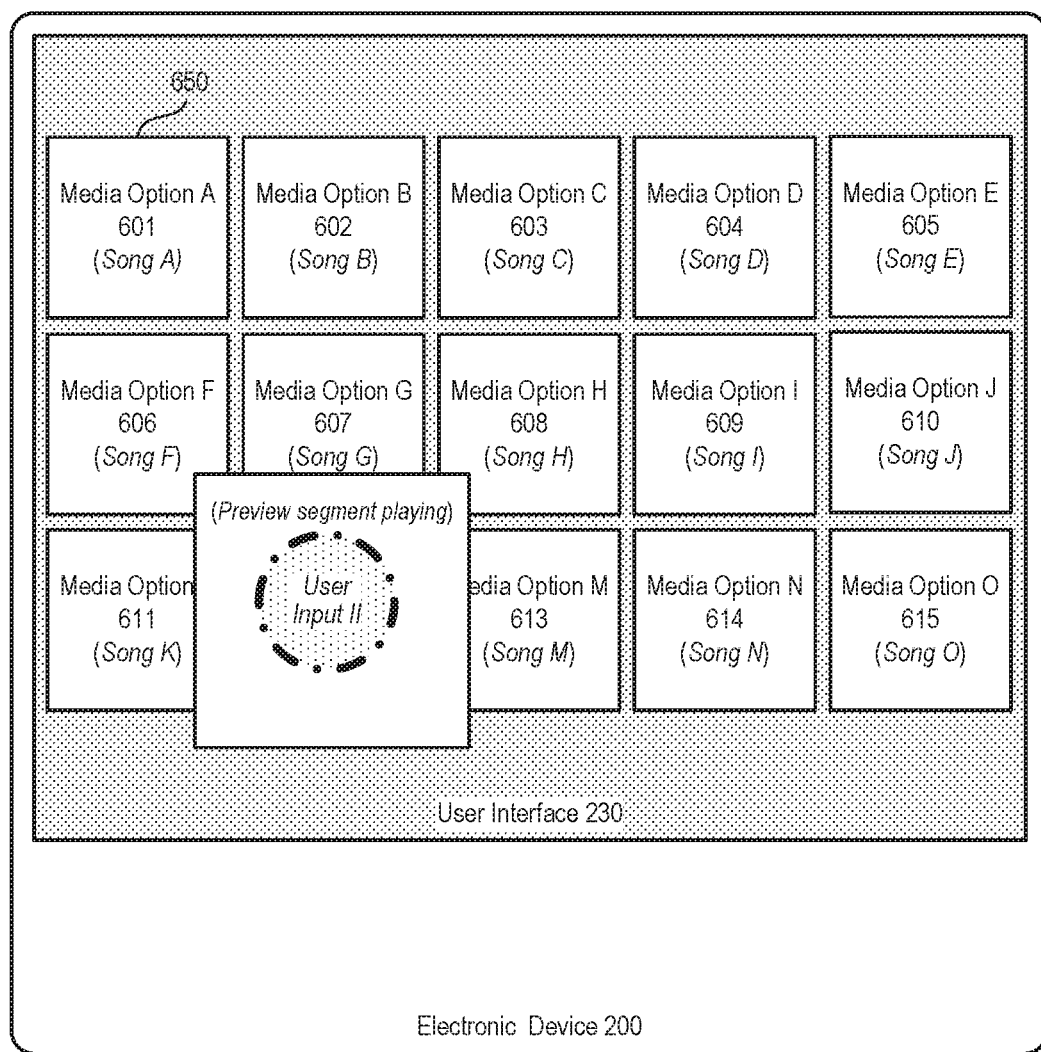

Turning now to FIG. 10B, a first request to playback a selected audio content item (in this example the audio content item corresponding to media option L) is received 910 (see FIG. 9). For example, in one embodiment, upon the user interface 230 of the electronic device 200 detecting a hovering gesture over the display area corresponding to the image tile associated with the selected audio content item, the electronic device 200 receives this first request to playback a selected audio content item. In response to receiving 910 the first request, the electronic device transmits 920, i.e. sends, a first data message comprising instructions to a computer server system to return a preview segment associated with the selected audio content item. As described earlier, this preview segment is a portion, or sample, from the selected audio content item, i.e. in this example media option L. Furthermore, the electronic device 200 receives 930 an unencrypted preview segment. In response thereto, the thus received unencrypted preview segment is played 940 at the user interface (e.g., through speaker(s) thereof).

Furthermore, the electronic device 200 may receive a second request, i.e. a new request, to continue playing the selected audio content item. For example, in one embodiment, upon a press gesture, or a tap gesture, within the display area corresponding to the earlier-mentioned selected image tile corresponding to media option L, the electronic device 200 receives the second request, or instruction, to play the entire audio content item associated with this selection. In response to receiving 950 the second request, the electronic device 200 transmits a second data message comprising instructions to the computer server system to return the selected audio content item, i.e. the entire selected audio content item. In response thereto, the electronic device 200 may further receive 960 the selected audio content item as an encrypted audio content item. Upon receiving 960 the audio content item, the electronic device decrypts 970 the received audio content item and, also, plays 980 the thus decrypted audio content item at the user interface (e.g., through speaker(s) thereof) of the electronic device 200.

The above example exemplifies that the selected audio content item (and/or the preview segment thereof) is played at the user interface 230 of the electronic device 200. In alternative embodiments, the electronic device 200 is further capable of remotely controlling one or more media presentation systems (not shown), such as one or several loudspeakers. To this end, the electronic device 200 may for example implement, or otherwise utilize, any of the techniques described in the international patent application PCT/IB2013/001938 (published under WO 2014/001913 A2) or in U.S. Patent Application Publication No. 2014/0006483 A1, each of which are herein incorporated by reference. For example, it is thus possible for a user of the electronic device 200 to remotely control the playback of selected audio content items (and/or preview segments thereof) through external loudspeakers. More specifically, in some embodiments, the electronic device may receive a media control command for a loudspeaker(s). In response to receiving this media control command, the electronic device 200 may send a server media control request to the computer server 300 and a local media control request to the loudspeaker(s), which may located be within the same local network as the electronic device 200 (i.e., a local network to which both the electronic device 200 and the loudspeaker(s) are connected). The server media control request may e.g. be sent to the computer server 300 over the Internet. Typically, but not necessarily, the computer server 300 is associated with an Internet Protocol (IP) address outside the space of the local network to which both the electronic device 200 and the loudspeaker(s) are connected. As will be appreciated, the electronic device 200 and the loudspeaker(s) can thus be associated with IP addresses within the same sub network. The electronic device 200 may hence provide a user interface 230 that allows a user 600 to operate the electronic device 200 and to select audio content items (such as songs) for presentation, thus playback, by the electronic device 200 itself and, also, to generate media control request(s) to cause the audio content items to be presented, or played, by the loudspeaker(s). Furthermore, the server media request and the local media request are both configured to cause a media control operation, performed at the electronic device 200, to be implemented at the loudspeakers, e.g. in accordance with the teaching of the international patent application PCT/IB2013/001938 and U.S. Patent Application Publication No. 2014/0006483 A1.

Figure 11:
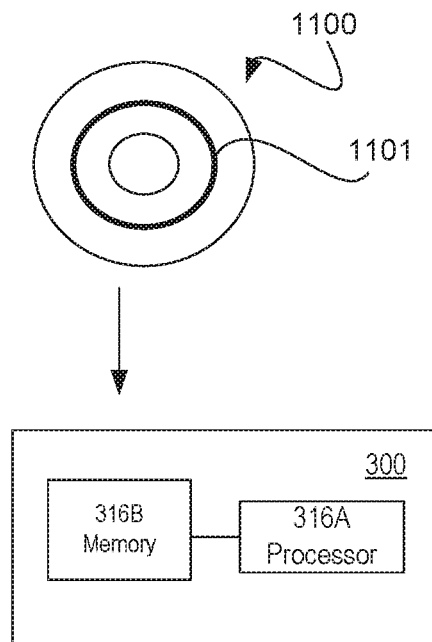
FIG. 11 illustrates a carrier containing a computer program, in accordance with an embodiment.

Turning now to FIG. 11, another embodiment will be briefly discussed. FIG. 11 shows an example of a computer-readable medium, in this example in the form of a data disc 1100. In one embodiment the data disc 1100 is a magnetic data storage disc. The data disc 1100 is configured to carry instructions 1101 that can be loaded into a memory 316B of a computer server system 300. Upon execution of said instructions by a processor 316A of the computer server system 300, the computer server system 300 is caused to execute a method or procedure according to any one of the embodiments described herein in conjunction with FIGS. 2 through 8. The data disc 1100 is arranged to be connected to or within and read by a reading device (not shown), for loading the instructions into the processor. One such example of a reading device in combination with one (or several) data disc(s) 1100 is a hard drive. It should be noted that the computer-readable medium can also be other mediums such as compact discs, digital video discs, flash memories or other memory technologies commonly used. In such an embodiment the data disc 1100 is one type of a tangible computer-readable medium. The instructions may alternatively be downloaded to a computer data reading device, such as a computer server system 300 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 316A of the computer server system 300. In such an embodiment, the computer-readable signal is one type of a non-tangible computer-readable medium.

Figure 12:
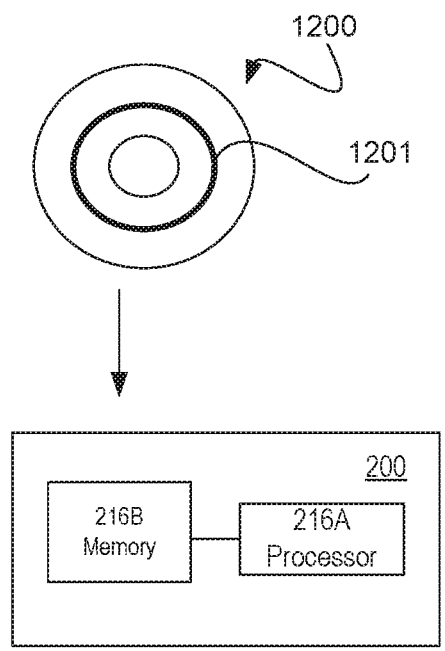
FIG. 12 illustrates a carrier containing a computer program, in accordance with another embodiment.

Turning now to FIG. 12, still another embodiment will be briefly discussed. FIG. 12 shows an example of a computer-readable medium, in this example in the form of a data disc 1200. In one embodiment the data disc 1200 is a magnetic data storage disc. The data disc 1200 is configured to carry instructions 1201 that can be loaded into a memory 210B of an electronic device 200. Upon execution of said instructions by a processor 210A of the electronic device 200, the electronic device 200 is caused to execute a method or procedure according to any one of the embodiments described herein in conjunction with FIGS. 9-10. The data disc 1200 is arranged to be connected to or within and read by a reading device (not shown), for loading the instructions into the processor. One such example of a reading device in combination with one (or several) data disc(s) 1200 is a hard drive. It should be noted that the computer-readable medium can also be other mediums such as compact discs, digital video discs, flash memories or other memory technologies commonly used. In such an embodiment the data disc 1200 is one type of a tangible computer-readable medium. The instructions may alternatively be downloaded to a computer data reading device, such as an electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such an embodiment, the computer-readable signal is one type of a non-tangible computer-readable medium.

Figure 13:
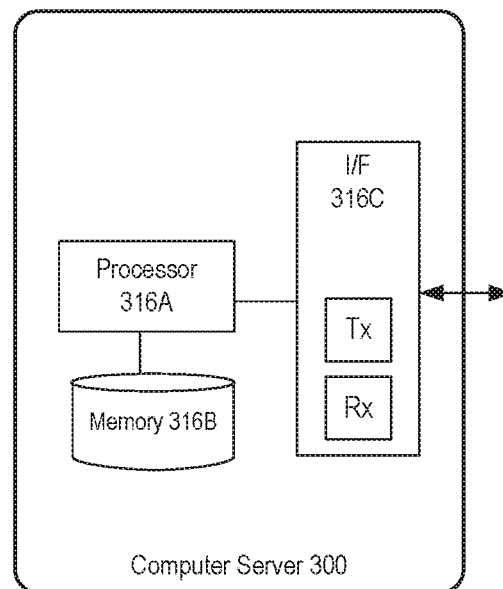
FIG. 13 illustrates an example implementation of an embodiment of a computer server system in FIG. 1.

With reference to FIG. 13, an example implementation of the computer server system 300 of FIG. 1 will be described in some further detail. For example, the computer server system 300 shown in FIG. 1 may comprise one or several computer servers, as described earlier. Furthermore, the computer server system 300 may comprise means adapted to perform the method described herein with reference to FIGS. 2-8. In one embodiment, the computer server system 300 thus comprises means adapted to receive a first data message comprising instructions from an electronic device to return a preview segment associated with a selected audio content item, the preview segment being a portion of the selected audio content item; means adapted to retrieve said selected audio content item from a first storage; means adapted to analyze audio content of the retrieved audio content item to locate a portion of the selected audio content item to be used as the preview segment; means adapted to extract the located portion of the selected audio content item from the retrieved audio content item; and means adapted to transmit the extracted portion of the selected audio content item unencrypted to the electronic device.

Furthermore, the computer server system 300 may comprise means adapted to partially encrypt the selected audio content item by encrypting an unextracted portion of the audio content item and by leaving the extracted portion of the selected audio content item unencrypted. For example, the computer server system 300 may also comprise means adapted to transmit the partially encrypted audio content item to the electronic device.

Still further, the computer server system 300 may comprise means adapted to receive a second data message including instructions from the electronic device to return the entire selected audio content item; means adapted to retrieve the entire selected audio content item from a second storage; means adapted to encrypt the entire retrieved audio content item; and means adapted to transmit the encrypted audio content item to the electronic device.

Moreover, the computer server system 300 may comprise means adapted to evaluate an audio pattern of the audio content item; and means adapted to locate said portion of the selected audio content item to be used as the preview segment based on the evaluation of the audio pattern. For example, the computer server system 300 may comprise means adapted to evaluate amplitude variations of the audio content item; and means adapted to locate said portion of the selected audio content item to be used as the preview segment based on the evaluation of the amplitude variations. In one example embodiment, the computer server system 300 comprises means adapted to evaluate amplitude variations of the audio content item only for a pre-defined duration at the beginning of the audio content item; and means adapted to locate said portion of the selected audio content item to be used as the preview segment by identifying a location of the audio content item where the amplitude changes drastically, i.e. where the amplitude changes from a lower amplitude value to a considerably higher amplitude value within a predefined period of time.

In yet another embodiment, the computer server system 300 comprises means adapted to divide the audio content item into several equally-sized segments of predefined duration; means adapted to compare the audio patterns of said equally-sized segments of the audio content item; means adapted to identify those equally-sized segments that have same or similar audio patterns; means adapted to group the equally-sized segments into groups, wherein each group comprises one or several equally-sized segments having the same or similar audio pattern; means adapted to count (for each group of equally-sized segments) the number equally-sized segments having the same or similar audio pattern; means adapted to establish the group that has the highest number of equally-sized segments having the same or similar audio patterns; and means adapted to interpret the group having the highest number of equally-sized segments with the same or similar audio patterns to represent a most interesting part of the audio content item. Also, the computer server system 300 may comprise means adapted to locate any one of the segments of the group having the highest number of equally-sized segments and use, or otherwise utilize, the thus located segment as the preview segment. Still further, the computer server system 300 may comprise means adapted to compare amplitudes of said equally-sized segments of the audio content item; and means adapted to identify those equally-sized segments that have same or similar amplitude values.

FIG. 13 schematically illustrates one example implementation of a computer server system, here exemplified by a single computer server in order to ease the understanding of the disclosure. The computer server 300 shown in FIG. 13 is configured to execute, or otherwise perform, the methods described throughout this disclosure with reference to FIGS. 2-8. As is schematically illustrated in FIG. 13, the computer server 300 comprises hardware 316. For example, the computer server 300 may comprise one or more processors 316A and one or more memories 316B. Also, a communications interface 316C, or a communications circuitry, may be provided in order to allow the computer server 300 to communicate with electronic devices 200 and/or other servers 300, e.g. via a network 400 such as the Internet. To this end, the communications interface 316C may comprise a transmitter (Tx) and a receiver (Rx). Alternatively, the communications interface 316C may comprise a transceiver (Tx/Rx) combining both transmission and reception capabilities. The communications interface 316C may include a radio frequency (RF) interface allowing the computer server 300 to communicate with electronic devices 200 and/or other servers 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. As described with reference to FIG. 1, the computer server 300 may also comprise one or more applications, e.g. the software application 310 including the media server application 312. The applications are sets of instructions (e.g., computer program code) that when executed by the one or more processors 316A controls the operation of the computer server 300.

In some implementations, the one or more memories 316B stores computer program code, which, when run in the one or more processors 316A causes the computer server to: receive, via the communications interface 316C, a first data message comprising instructions from an electronic device to return a preview segment associated with a selected audio content item, the preview segment being a portion of the selected audio content item; retrieve said selected audio content item from a first storage; analyze audio content of the retrieved audio content item to locate a portion of the selected audio content item to be used as the preview segment; extract the located portion of the selected audio content item from the retrieved audio content item; and transmit, via the communications interface 316C, the extracted portion of the selected audio content item unencrypted to the electronic device.

In some implementations, the one or more memories 316B stores computer program code, which, when run in the one or more processors 316A causes the computer server 300 to retrieve the entire selected audio content item from the first storage.

In some implementations, the one or more memories 316B stores computer program code, which, when run in the one or more processors 316A causes the computer server 300 to partially encrypt the selected audio content item by encrypting an unextracted portion of the audio content item; and leaving the extracted portion of the selected audio content item unencrypted.

In some implementations, the one or more memories 316B stores computer program code, which, when run in the one or more processors 316A causes the computer server 300 to transmit, via the communications interface 316C, the partially encrypted audio content item to the electronic device.

In some implementations, the one or more memories 316B stores computer program code, which, when run in the one or more processors 316A causes the computer server 300 to receive, via the communications interface 316C, a second data message including instructions from the electronic device to return the entire selected audio content item; retrieve the entire selected audio content item from a second storage; encrypt the entire retrieved audio content item; and transmit, via the communications interface 316C, the encrypted audio content item to the electronic device.

In some example implementations, the first storage and the second storage are the same storage.

In some implementations, the one or more memories 316B stores computer program code, which, when run in the one or more processors 316A causes the computer server 300 to analyze the audio content from only a portion of the retrieved audio content item. For example, said portion of the retrieved audio content item comprises a portion having a predefined duration. This predefined duration may for example be 30 seconds, 60 seconds or 90 seconds. In some implementations, said portion is a portion at the beginning of the retrieved audio content item.

In some implementations, the one or more memories 316B stores computer program code, which, when run in the one or more processors 316A causes the computer server 300 to evaluate an audio pattern of the audio content item; and locate said portion of the selected audio content item to be used as the preview segment based on the evaluation of the audio pattern. For example, in some implementations, the one or more memories 316B stores computer program code, which, when run in the one or more processors 316A causes the computer server 300 to evaluate amplitude variations of the audio content item; and locate said portion of the selected audio content item to be used as the preview segment based on the evaluation of the amplitude variations.

In some implementations, the one or more memories 316B stores computer program code, which, when run in the one or more processors 316A causes the computer server 300 to evaluate amplitude variations of the audio content item only for a pre-defined duration at the beginning of the audio content item; and locate said portion of the selected audio content item to be used as the preview segment by identifying a location of the audio content item where the amplitude changes drastically, i.e., where the amplitude changes from a lower amplitude value to a considerably higher amplitude value within a predefined period of time.

In some implementations, the one or more memories 316B stores computer program code, which, when run in the one or more processors 316A causes the computer server 300 to divide the audio content item into several equally-sized segments of predefined duration; compare the audio patterns of said equally-sized segments of the audio content item; identify those equally-sized segments that have same or similar audio patterns; group the equally-sized segments into groups, wherein each group comprises one or several equally-sized segments having the same or similar audio pattern; for each group of equally-sized segments, count the number equally-sized segments having the same or similar audio pattern; establish the group that has the highest number of equally-sized segments having the same or similar audio patterns; interpret the group having the highest number of equally-sized segments with the same or similar audio patterns to represent a most interesting part of the audio content item; and locate any one of the segments of the group having the highest number of equally-sized segments and utilize the thus located segment as the preview segment.

In some implementations, the one or more memories 316B stores computer program code, which, when run in the one or more processors 316A causes the computer server 300 to compare amplitudes of said equally-sized segments of the audio content item; and identify those equally-sized segments that have same or similar amplitude values.

Figure 14:
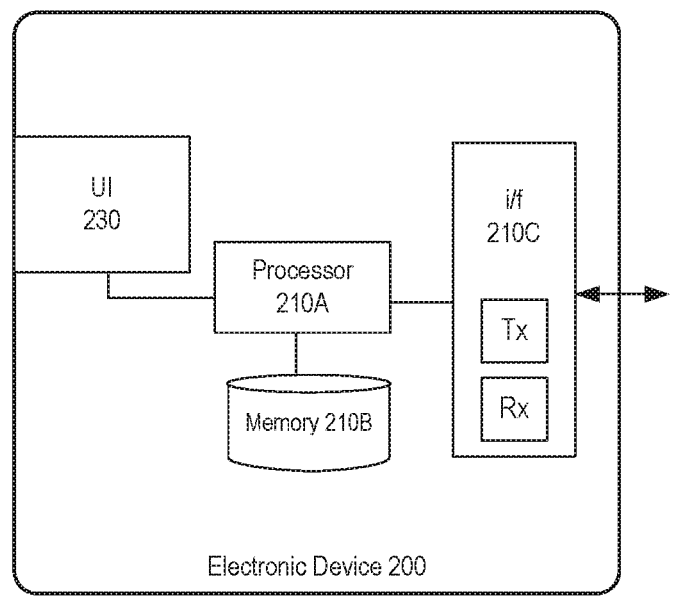
FIG. 14 illustrates an example implementation of an embodiment of an electronic device in FIG. 1.

With reference to FIG. 14, an example implementation of the electronic device of FIG. 1 will be described in some further detail. For example, electronic device may be implemented as a stationary electronic device, such as a stationary computer. Alternatively, the electronic device 200 may be embodied as a portable electronic device, such as a mobile telephone, a cellular telephone, a tablet computer, a laptop computer, or a personal digital assistant. In some embodiments, the electronic device 200 may comprise means adapted to perform the method described herein with reference to FIGS. 9-10. In one embodiment, the electronic device 200 thus comprises means adapted to receive a first request to play a selected audio content item (e.g., at a user interface of the electronic device), means adapted to transmit a first data message comprising instructions to a computer server system to return a preview segment associated with the selected audio content item, the preview segment being a portion of the selected audio content item; means adapted to receive an unencrypted preview segment from the computer server system; means adapted to play the unencrypted preview segment (e.g., at the user interface of the electronic device); means adapted to receive a second request to continue playing the selected audio content item; means adapted to transmit a second data message comprising instructions to the computer server system to return the selected audio content item; means adapted to receive the selected audio content item as an encrypted audio content item; means adapted to decrypt the received audio content item; and means adapted to play the thus decrypted audio content item (e.g., at the user interface of the electronic device).

FIG. 14 illustrates an example implementation of the electronic device 200, which is suitable for playback of an audio content item, e.g. a song or the like. The electronic device 200 is configured to execute, or otherwise perform, the method described with respect to. As is schematically illustrated in FIG. 14, the electronic device 200 comprises hardware 210A-C. For example, the electronic device 200 may comprise one or more processors 210A and one or more memories 210B. Also, a communications interface 210C may be provided in order to allow the electronic device 200 to communicate with other electronic devices and/or servers 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the electronic device 200 to communicate with other devices and/or servers 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. The electronic device 200 may further comprise a user interface 230, as described earlier herein. Hence, the user interface 230 may advantageously include a touch-sensitive display. As such, the touch-sensitive display may be a touch screen display upon which virtual keys may be displayed and operated. Furthermore, the user interface 230 may include output means such as loudspeakers (not shown). As described with reference to FIG. 1, the electronic device 200 may comprise one or more applications, e.g. the media playback application 220. The applications are sets of instructions (e.g., computer program code) that when executed by the one or more processors 210A controls the operation of the electronic device 200. In some implementations, the one or more memories 210B stores computer program code, which, when run in the one or more processors 210A causes the electronic device 200 to receive a first request to play a selected audio content item (e.g., at a user interface of the electronic device); in response to receiving the first request, transmit, via the communications interface 210C, a first data message comprising instructions to a computer server system to return a preview segment associated with the selected audio content item, the preview segment being a portion of the selected audio content item; receive, via the communications interface 210C, an unencrypted preview segment from the computer server system; in response thereto play the unencrypted preview segment (e.g., at the user interface such as via a loudspeaker) of the electronic device; receive a second request to play the selected audio content item; in response to receiving the second request, transmit, via the communications interface 210C, a second data message comprising instructions to the computer server system to return the selected audio content item; receive the selected audio content item as an encrypted audio content item; in response thereto, decrypt the received audio content item; and playing the thus decrypted audio content item (e.g., at the user interface of the electronic device such as via a loudspeaker).

The various embodiments described in this disclosure allow an electronic device 200 to receive an unencrypted preview segment, which is a shorter preview version of the selected audio content item. This disclosure recognizes the fact that most content owners would accept that shorter versions (e.g., in the form the preview segments, or samples) of the entire content have comparatively less protection against unauthorized use for the benefit of giving the users the freedom of previewing a portion of the selected audio content item. Since the preview segments are received unencrypted, an electronic device 200 does not need to decrypt the received preview segment. This may save the resource usage such as battery consumption and/or processor usage of the electronic device 200. Also, the provision of smaller unencrypted preview segments of the audio content items may allow for a reduction in the required loading times for playback preview segments and, simultaneously, allow for an uninterrupted user experience. The described approach also recognizes that the playback of a smaller unencrypted preview segment may have the psychological effect that the users will perceive the playback of these smaller preview segments as if the smaller preview segment is being played back at the user interface immediately. In other words, from the user's perception the playing back of the preview segments, i.e., the audio content item samples, seems immediate. Furthermore, it is advantageous that the audio content of the retrieved audio content item is analyzed in order to locate a portion of the selected audio content item to be used as the preview segment. For example, it may be possible to locate a portion of the selected audio content item that is a good representation of the entire selected audio content item, or a portion which is represents an interesting portion of the selected audio content item. By locating a good representation of the entire selected audio content item, or a portion which is represents an interesting portion of the selected audio content item, a user's browsing of a multitude of audio content items may be facilitated in that the user may find what he or she is looking for quicker.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while certain gestures (e.g., hovering gestures, press gestures, and tap gestures) have been described to exemplify some embodiments of the invention, other conceivable gestures also exist (e.g. flick gestures, swipe gestures, swipe-and-hold gestures, release-of-hold gestures) that could be contemplated when reducing embodiments of the invention into practice. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method for streaming an audio content item to an electronic device, wherein the method is performed by a computer server system comprising one or several computer servers, and wherein the method comprises:
    receiving as a first data message from an electronic device, an instruction to return a preview segment associated with a selected audio content item, wherein the preview segment represents a portion of the selected audio content item;
    retrieving said selected audio content item from a first storage;
    analyzing audio content of the retrieved audio content item to locate a portion of the selected audio content item to be used as the preview segment, based on a determination of:
        a plurality of groups of segments within the selected audio content item,
        wherein each segment has an audio pattern associated therewith, and
        wherein each particular group of segments includes one or more segments having a same or similar audio pattern; and
        a particular segment within the particular group of segments that is representative of the audio content item;
    extracting the located portion of the selected audio content item from the retrieved audio content item;
    transmitting the extracted portion of the selected audio content item to the electronic device as the preview segment, to be played at the electronic device; and
    while continuing to receive instructions to return preview segments associated with additional audio content items, selectively determining and providing extracted portions of corresponding audio content items to the electronic device as the preview segments.

2. The method of claim 1, wherein retrieving said selected audio content item from the first storage comprises retrieving the entire selected audio content item from the first storage.

3. The method of claim 1, comprising partially encrypting the selected audio content item by:
    encrypting an unextracted portion of the audio content item; and
    leaving the extracted portion of the selected audio content item unencrypted.

4. The method of claim 3, further comprising:
    transmitting the partially encrypted audio content item to the electronic device.

5. The method of claim 1, further comprising:
    receiving a second data message including instructions from the electronic device to return the entire selected audio content item;
    retrieving the entire selected audio content item from a second storage;
    encrypting the entire retrieved audio content item; and
    transmitting the encrypted audio content item to the electronic device.

6. The method of claim 5, wherein the first storage and the second storage are a same storage.

7. The method of claim 1, wherein analyzing audio content of the retrieved audio content item to locate a portion of the selected audio content item to be used as the preview segment, comprises:
    analyzing the audio content from a portion of the retrieved audio content item.

8. The method of claim 7, wherein said portion of the retrieved audio content item comprises a portion having a predefined duration.

9. The method of claim 8, wherein the duration is 30 seconds, 60 seconds or 90 seconds.

10. The method of claim 9, wherein said portion is a portion at the beginning of the retrieved audio content item.

11. The method of claim 1, wherein analyzing audio content of the retrieved audio content item comprises:
    evaluating an audio pattern of the audio content item; and
    locating said portion of the selected audio content item to be used as the preview segment based on the evaluation of the audio pattern.

12. The method of claim 11, comprising:
    evaluating amplitude variations of the audio content item; and
    locating said portion of the selected audio content item to be used as the preview segment based on the evaluation of the amplitude variations.

13. The method of claim 12, comprising:
    evaluating amplitude variations of the audio content item for a pre-defined duration at the beginning of the audio content item; and
    locating said portion of the selected audio content item to be used as the preview segment by identifying a location of the audio content item where the amplitude changes from a lower amplitude value to a considerably higher amplitude value within a predefined period of time.

14. The method of claim 11, comprising:
    dividing the audio content item into several equally-sized segments of predefined duration;
    comparing the audio patterns of said equally-sized segments of the audio content item;
    identifying those equally-sized segments that have same or similar audio patterns;

grouping the equally-sized segments into groups, wherein each group comprises one or several equally-sized segments having the same or similar audio pattern;

for each group of equally-sized segments, counting the number equally-sized segments having the same or similar audio pattern; and establishing the group that has the highest number of equally-sized segments having the same or similar audio patterns; and interpreting the group having the highest number of equally-sized segments with the same or similar audio patterns to represent a most interesting part of the audio content item; wherein locating said portion of the selected audio content item to be used as the preview segment comprises locating any one of the segments of the group having the highest number of equally-sized segments and using the located segment as the preview segment.

15. The method of claim 14, wherein:

comparing the audio patterns of said equally-sized segments of the audio content item comprises comparing amplitudes of said equally-sized segments of the audio content item; and identifying those equally-sized segments that have same or similar audio patterns comprises identifying those equally-sized segments that have same or similar amplitude values.

16. The method of claim 1, wherein the electronic device displays, at a user interface, a visual array of media options, wherein each media option in the visual array of media options corresponds to a respective audio content item that can be streamed to the electronic device; and as media options are selected within the visual array, continuing to receive preview segments associated with corresponding audio content items, at the electronic device.

17. A computer server system, comprising:

one or more processors; and memory storing one or more programs for execution by the one or more processors, the one or more programs including instructions for performing the method of receiving as a first data message from an electronic device, an instruction to return a preview segment associated with a selected audio content item, wherein the preview segment represents a portion of the selected audio content item;

retrieving said selected audio content item from a first storage;

analyzing audio content of the retrieved audio content item to locate a portion of the selected audio content item to be used as the preview segment, based on a determination of:

a plurality of groups of segments within the selected audio content item, wherein each segment has an audio pattern associated therewith, and wherein each particular group of segments includes one or more segments having a same or similar audio pattern; and a particular segment within the particular group of segments that is representative of the audio content item;

extracting the located portion of the selected audio content item from the retrieved audio content item;

transmitting the extracted portion of the selected audio content item to the electronic device as the preview segment, to be played at the electronic device; and while continuing to receive instructions to return preview segments associated with additional audio content items, selectively determining and providing extracted portions of corresponding audio content items to the electronic device as the preview segments.

18. The computer server system of claim 17, wherein the electronic device displays, at a user interface, a visual array of media options, wherein each media option in the visual array of media options corresponds to a respective audio content item that can be streamed to the electronic device; and as media options are selected within the visual array, continuing to receive preview segments associated with corresponding audio content items, at the electronic device.

19. A method performed by an electronic device for playback of an audio content item, the method comprising:

receiving a first request to play a selected audio content item;

in response to receiving the first request, transmitting a first data message comprising instructions to a computer server system to return a preview segment associated with the selected audio content item, wherein the preview segment represents a portion of the selected audio content item;

wherein the server:

retrieves said selected audio content item from a first storage;

analyzes audio content of the retrieved audio content item to locate a portion of the selected audio content item to be used as the preview segment, based on a determination of:

a plurality of groups of segments within the selected audio content item, wherein each segment has an audio pattern associated therewith, and wherein each particular group of segments includes one or more segments having a same or similar audio pattern; and a particular segment within the particular group of segments that is representative of the audio content item;

extracts the located portion of the selected audio content item from the retrieved audio content item;

transmits the extracted portion of the selected audio content item to the electronic device as the preview segment, to be played at the electronic device; and continues to receive instructions to return preview segments associated with additional audio content items, and selectively determines and provides extracted portions of corresponding audio content items to the electronic device as the preview segments;

receiving the preview segment from the computer server system;

in response thereto playing the preview segment;

receiving a second request to continue playing the selected audio content item;

in response to receiving the second request, transmitting a second data message comprising instructions to the computer server system to return the selected audio content item;

receiving the selected audio content item as an audio content item; and playing the audio content item.

20. The method of claim 19, wherein the electronic device displays, at a user interface, a visual array of media options, wherein each media option in the visual array of media options corresponds to a respective audio content item that can be streamed to the electronic device; and as media options are selected within the visual array, continuing to receive preview segments associated with corresponding audio content items, at the electronic device.

* * * * *